US009542174B2

(12) United States Patent
Di Cocco et al.

(10) Patent No.: US 9,542,174 B2
(45) Date of Patent: Jan. 10, 2017

(54) DEPLOYMENT OF SOFTWARE IMAGES WITH DISTINCT CONFIGURATION LOGIC

(71) Applicant: GLOBALFOUNDRIES INC., Grand Cayman (KY)

(72) Inventors: Antonio Di Cocco, Rome (IT); Claudio Marinelli, Rome (IT); Luigi Pichetti, Rome (IT)

(73) Assignee: GLOBALFOUNDRIES Inc., Grand Cayman (KY)

( * ) Notice: Subject to any disclaimer, the term of this patent is extended or adjusted under 35 U.S.C. 154(b) by 252 days.

(21) Appl. No.: 14/303,217

(22) Filed: Jun. 12, 2014

(65) Prior Publication Data
US 2015/0039875 A1 Feb. 5, 2015

(30) Foreign Application Priority Data

Jul. 31, 2013 (GB) .................................. 1313723.7

(51) Int. Cl.
*G06F 9/44* (2006.01)
*G06F 9/445* (2006.01)

(52) U.S. Cl.
CPC . *G06F 8/68* (2013.01); *G06F 8/63* (2013.01); *G06F 9/4416* (2013.01); *G06F 8/60* (2013.01)

(58) Field of Classification Search
CPC ........ G06F 9/4411; G06F 8/60; G06F 9/4406; G06F 8/63; G06F 8/68; G06F 8/70
USPC ........................................................ 713/1, 2
See application file for complete search history.

(56) References Cited

U.S. PATENT DOCUMENTS

| 8,255,484 | B2 | 8/2012 | Khandekar et al. | |
|---|---|---|---|---|
| 2004/0006688 | A1* | 1/2004 | Pike | G06F 8/61 713/1 |
| 2007/0101342 | A1* | 5/2007 | Flegg | G06F 9/4411 719/321 |
| 2008/0104588 | A1 | 5/2008 | Barber et al. | |
| 2008/0271017 | A1 | 10/2008 | Herington | |
| 2010/0235828 | A1* | 9/2010 | Nishimura | G06F 9/45537 717/174 |
| 2011/0078681 | A1 | 3/2011 | Li et al. | |
| 2011/0138449 | A1 | 6/2011 | Jirka et al. | |
| 2011/0208929 | A1* | 8/2011 | McCann | G06F 3/0604 711/162 |

(Continued)

FOREIGN PATENT DOCUMENTS

CN 102110009 A 6/2011

OTHER PUBLICATIONS

Wei et al., "Managing Security of Virtual Machine Images in a Cloud Environment," Proceedings of the 2009 ACM Workshop on Cloud Computing Security (CCSW'09), Nov. 2009, pp. 91-96.

(Continued)

*Primary Examiner* — Thomas Lee
*Assistant Examiner* — Santosh R Poudel
(74) *Attorney, Agent, or Firm* — Thompson Hine LLP (57) ABSTRACT

A solution for deploying a software image comprising a target operating system on a target computing machine is proposed. A corresponding method comprises mounting the software image as a storage device, identifying each software program comprised in the software image, downloading a configuration logic for configuring each software program, applying each configuration logic against the software image, and booting the target computing machine from the target operating system.

17 Claims, 5 Drawing Sheets

(56) References Cited

U.S. PATENT DOCUMENTS

| | | | |
|---|---|---|---|
| 2011/0231455 A1* | 9/2011 | Joukov | G06F 8/60 707/822 |
| 2012/0204173 A1 | 8/2012 | Liu | |
| 2012/0233611 A1 | 9/2012 | Voccio | |
| 2012/0246639 A1 | 9/2012 | Kashyap | |
| 2012/0257820 A1* | 10/2012 | Sanghvi | G06F 9/4856 382/159 |
| 2013/0007727 A1 | 1/2013 | Donatelli et al. | |
| 2013/0007731 A1 | 1/2013 | Fries | |
| 2013/0132950 A1* | 5/2013 | McLeod | G06F 8/63 718/1 |
| 2013/0152084 A1 | 6/2013 | Arcese et al. | |

OTHER PUBLICATIONS

"Method and System for an Effective and Secure Composition of a Virtual Image in a Cloud Environment," IP.com Prior Art Database Technical Disclosure No. IPCOM000224880D, Jan. 9, 2013, 4 pages.

"Method and System for Fast Virtual Image Provisioning in Cloud Environment," IP.com Prior Art Database Technical Disclosure No. IPCOM000210398D, Sep. 2, 2011, 8 pages.

\* cited by examiner

DEPLOYMENT OF SOFTWARE IMAGES WITH DISTINCT CONFIGURATION LOGIC

CROSS-REFERENCE TO RELATED APPLICATIONS

This application claims the benefit of priority to United Kingdom Patent Application No. GB1313723.7, filing date Jul. 31, 2013, the contents of which are hereby incorporated by reference.

TECHNICAL FIELD

The present disclosure relates to the information technology field. More specifically, this disclosure relates to the deployment of software images.

BACKGROUND

Deployment of software images is a commonplace activity in modern computing systems; generally speaking, a software image is a structure that encapsulates the content of a mass memory of a computing machine. The software images are suitable to be moved, copied, replicated, protected and profiled in a very simple way. These advantages are clearly perceived when the software images are used in virtual (computing) machines, i.e., emulations by software of physical (computing) machines provided by a virtualisation layer; indeed, in this case whatever virtual machine may be provisioned on-demand by simply instantiating and then booting it from a desired software image. For example, this is particularly useful in cloud (computing) environments, wherein users of a network are allowed to access computing resources (comprising virtual machines) on-demand as services. In this way, the users are relieved from the management of the actual physical resources that are needed to implement the cloud resources (for example, their installation and maintenance); particularly, this provides economies of scale, improved exploitation of the physical resources, and high peak-load capacity. Moreover, the users are now allowed to perform tasks (for example, on a pay-per-use basis) that were not feasible previously because of their cost and complexity (especially for individuals or small companies). The de-coupling of the cloud resources from their implementation provides the illusion of an infinite capacity thereof; moreover, the de-localization of the physical resources implementing the cloud resources enables the users to access them from anywhere.

However, every cloud environment generally requires specific configurations of its virtual machines; a typical example is the setting of their operating systems (for example, with respect to network parameters). Therefore, different software images may be required for deploying a same structure on different cloud environments, even if they use the same virtualization layer.

Alternatively, the same software image may be deployed on different cloud environments, and then specifically configured with a process know as re-activation; the re-activation process may be performed either manually or by means of suitable scripts that are executed automatically at a first bootstrap of the computing machines.

For example, it is possible to boot a (pristine) computing machine from a network. More specifically, a boot loader launches a network boot loader (for example, the PXE) embedded in a network adapter thereof since it does not find any bootable device; the network boot loader exploits a dynamic address service (for example, the DHCP) to obtain a dynamic address, and then downloads a network bootstrap program (for example, the WinPE by Microsoft Corporation, trademarks thereof) providing a minimal operating system. The network bootstrap program applies the required configurations, and then re-boots the computing machine from the actual operating system of the software image.

A different technique is described in US-A-2012/0204173 (the entire disclosure of which is herein incorporated by reference). In this case, a computing device may configure virtual machines (either before or after their booting) by using configuration commands. Logic associated with reading from and writing to the application and operating system files may be encapsulated in a virtual machine module, which may have an Application Programming Interface (API). The computing device may include a memory storing computer code including an access module to access one or more application files and operating system files included in each of the virtual machine image files; the access module may include an operating system extension provided by a Virtual Machine Management System (VMMS) that mounts a virtual machine image file into an operating system as a drive or a directory accessible by code executing within the operating system.

However, the configuration of each software image is generally performed in the same context of the operating system that is used in a production environment thereof; therefore, configuration and usage of the software image are tightly correlated.

In any case, what is configured in the software image and how this configuration occurs are always mixed together.

SUMMARY

A simplified summary of the present disclosure is herein presented in order to provide a basic understanding thereof; however, the sole purpose of this summary is of introducing some concepts of the disclosure in a simplified form as a prelude to its following more detailed description, and it is not to be interpreted as an identification of its key elements nor as a delineation of its scope.

In general terms, the present disclosure is based on the idea of separating the logic for configuring the software image.

Particularly, one or more aspects of the present disclosure are set out in the independent claims and advantageous features thereof are set out in the dependent claims, with the wording of all the claims that is herein incorporated verbatim by reference (with any advantageous feature provided with reference to a specific aspect that applies mutatis mutandis to every other aspect).

More specifically, an aspect provides a method for deploying a software image, wherein the software image is mounted as a storage device, each software program comprised therein is identified, and a configuration logic for configuring each software program is downloaded and applied against the software image.

A further aspect provides a corresponding computer program (and a corresponding computer program product).

A further aspect provides a corresponding system.

BRIEF DESCRIPTION OF THE DRAWINGS

The solution of the present disclosure, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
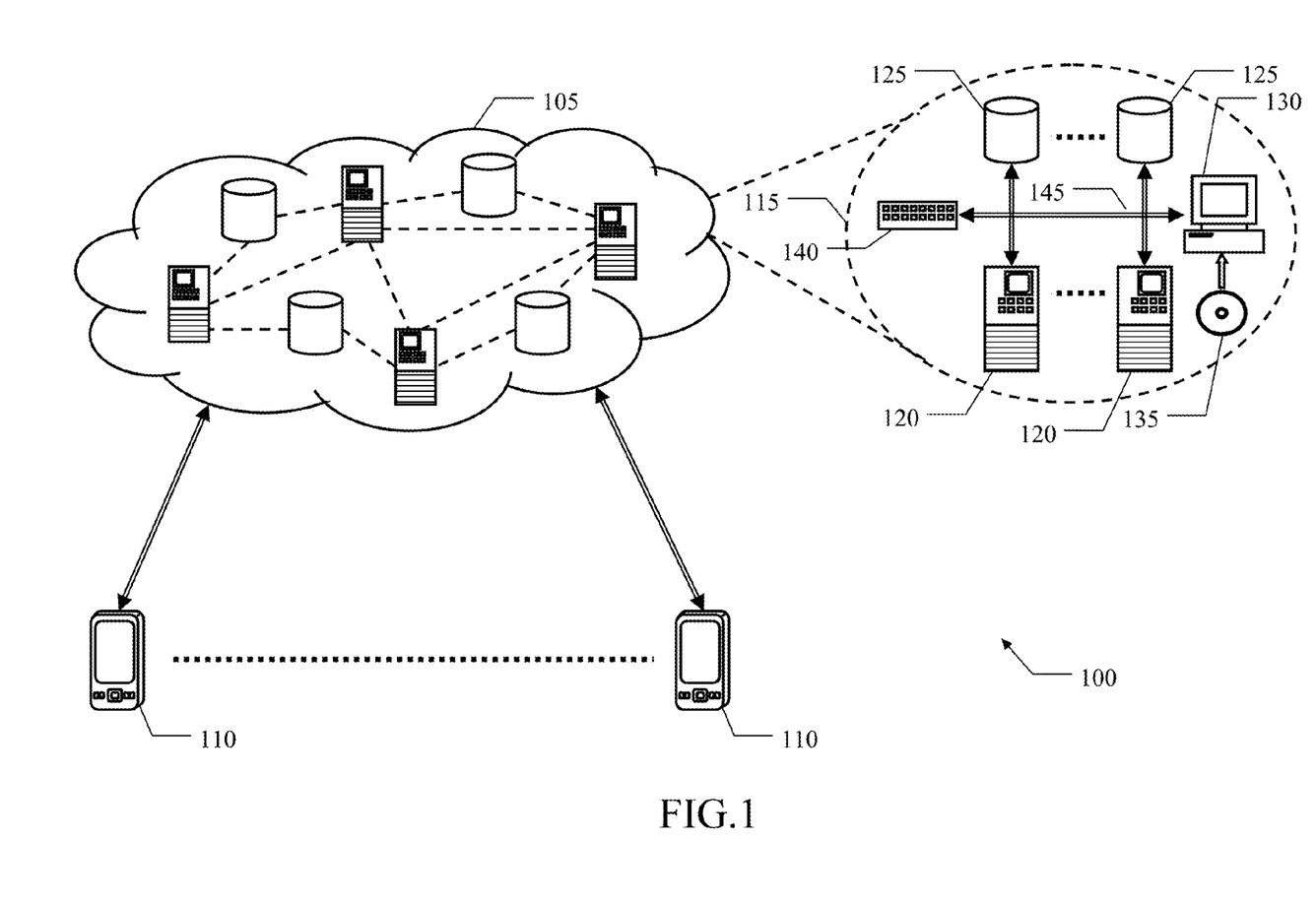
FIG. 1 shows a schematic block-diagram of a computing system wherein the solution according to an embodiment of the present disclosure may be applied.

With reference in particular to the FIG. 1, a schematic block-diagram is shown of a computing system 100 wherein the solution according to an embodiment of the present disclosure may be applied.

The computing system comprises a cloud (computing) environment 105, which makes available cloud resources on-demand as cloud services (comprising virtual machines emulated by a virtualization layer). The cloud services may be supplied according to several service models, particularly, Infrastructure as a Service, or IaaS (providing computing and storage resources with corresponding management software, such as virtual machines, virtual storage, firewalls, load balancers, and the like), Platform as a Service, or PaaS (providing software platforms, such as databases, web servers, development tools, and the like), Software as a Service, or SaaS (providing application programs, such as e-mails, CRMs, office suites, and the like), and Network as a service, or NaaS (providing connectivity services, such as VPN, bandwidth on demand, and the like). The cloud services are made available by corresponding cloud providers according to different deployment models, particularly, public cloud (i.e., for the general public), private cloud (i.e., for a single organization), community cloud (i.e., for several organizations), or hybrid cloud (based on a combination of different deployment models).

Several users may access the cloud environment 105 by connecting with a corresponding client computing machine (or simply client) 110 to the cloud environment 105 through a communication network, such as the Internet in a public/community cloud or a LAN in a private cloud (not shown in the figure); each user has the sole control of his/her cloud resources, which may then be used exactly as if they were dedicated physical resources. For this purpose, the cloud environment 105 exposes a front-end (which may be accessed, for example, via a web browser or a mobile app); on the contrary, a back-end of the cloud environment 105 actually providing the cloud resources is completely opaque to the users.

The cloud environment 105 is generally implemented by a pool of one or more server farms 115 (only one shown in the figure), which are loosely coupled to each other and have a redundant architecture to ensure the required reliability level.

Each server farm 115 is formed by several computing machines operating as servers 120 (for example, of the rack or blade type) and several storage disks 125 (for example, of the RAID type); the server farm 120 also comprises a console 130 for controlling the servers 120 and the disks 125 (for example, a personal computer, also provided with a drive for reading removable storage devices 135, such as DVD-ROMs). A switch/router system 140 manages communications among the servers 120, the disks 125 and the console 130, and with the network; for this purposes, the servers 120, the disks 125 and the console 130 are connected to the switch/router system 140 through a cabling system 145.

With reference now to the FIG. 2A-FIG. 2D, a pictorial representation is shown of an exemplary application of the solution according to an embodiment of the present disclosure.

Figure 2A:
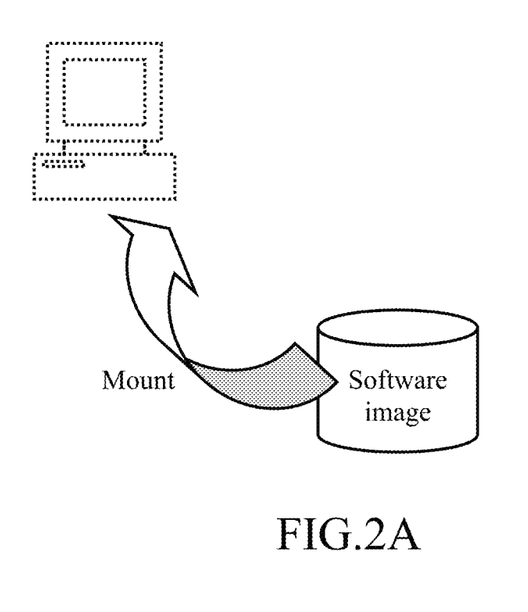
FIG. 2A-FIG. 2D show a pictorial representation of an exemplary application of the solution according to an embodiment of the present disclosure.

Starting from the FIG. 2A, a software image to be deployed on a target computing machine (for example, a target virtual machine of the above-described cloud environment) is mounted as a storage device (for example, in the same target virtual machine booted from a dedicated configuration operating system or in another configuration virtual machine implementing a configuration service). Each software program comprised in the software image is then identified (for example, by scanning its content); particularly, the software programs of the software image comprise a target operating system for the target computing machine (directly running on its emulated hardware) and possible application programs (running on the target operating system).

Figure 2B:
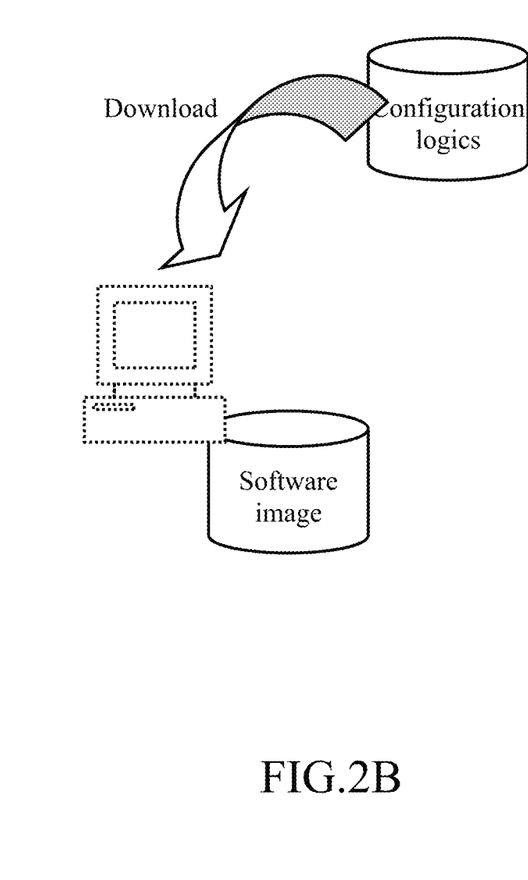

Moving to the FIG. 2B, a configuration logic for configuring each software program (for example, a configuration script) is downloaded (for example, from an external repository).

Figure 2C:
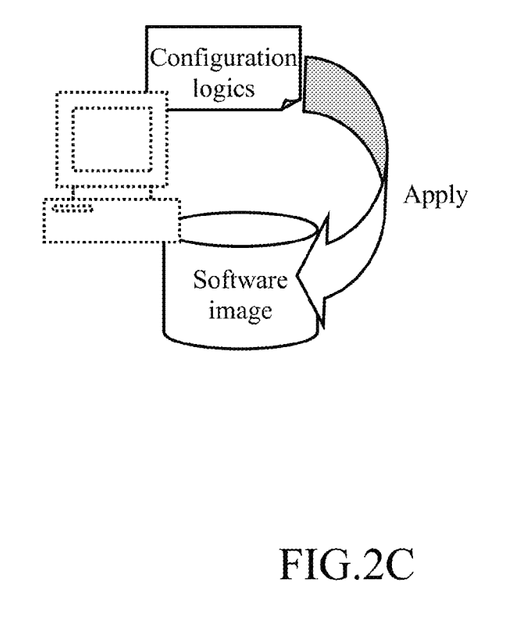

Moving to the FIG. 2C, each configuration logic is applied against the software image (for example, by executing its configuration script that updates a configuration file of the corresponding software program).

Figure 2D:
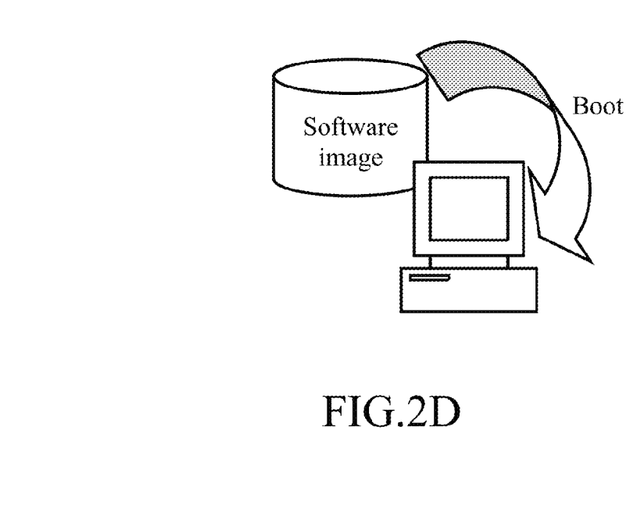

Moving to the FIG. 2D, the target computing machine is now booted from the target operating system of the software image so configured.

In this way, the configuration of the software image is performed in a context that is different from its target operating system (to be used in a production environment thereof); therefore, configuration and usage of the software image are clearly separated. Particularly, it is possible to avoid any dedicated instrumentation of the target operating system (for implement the configuration of the software image).

This allows decoupling what is configured in the software image from how this configuration occurs; as a result, the software image is unaffected by any change over time of the configuration logics (for example, for the application of corresponding patches).

Figure 3:
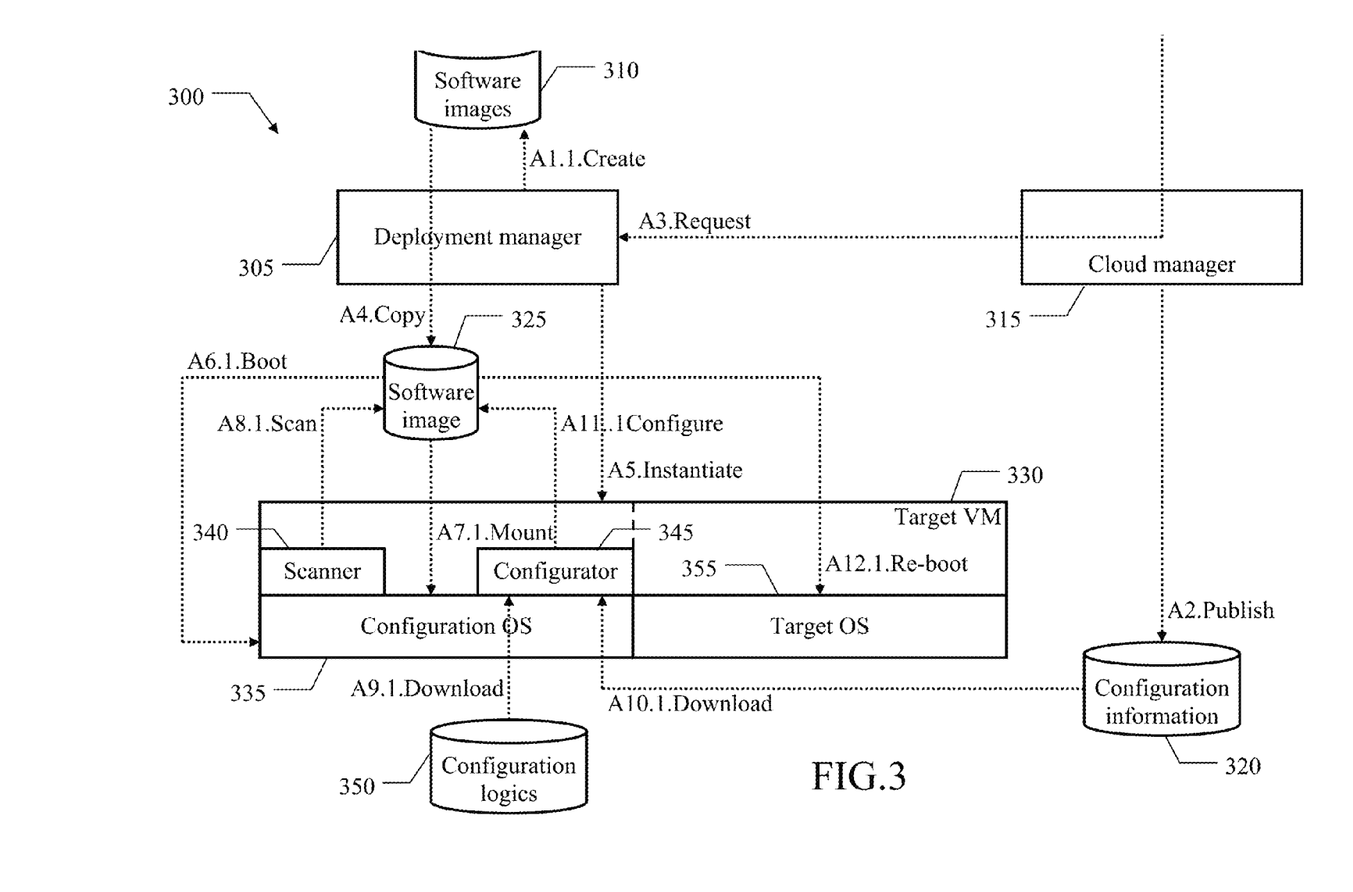
FIG. 3 shows a collaboration diagram representing the roles of the main software components that may be used to implement the solution according to an embodiment of the present disclosure.

With reference now to the FIG. 3, a collaboration diagram is shown representing the roles of the main software components that may be used to implement the solution according to an embodiment of the present disclosure.

Particularly, all the software components (programs and data) are denoted as a whole with the reference 300. The software components 300 are typically stored in the mass memory and loaded (at least partially) into the working memory of each computing machine when the programs are running The programs are initially installed onto the mass memory, for example, from removable storage devices or from the network. In this respect, each software component may represent a module, segment or portion of code, which comprises one or more executable instructions for implementing the specified logical function. Particularly, the figure describes both the static structure of the software components and their dynamic behavior (by means of a series of exchanged messages, each one representing a corresponding operation, denoted with sequence numbers preceded by the symbol "A").

In detail, a deployment manager 305 (for example, the IBM Tivoli Provisioning Manager for OS Deployment (TP-MfOSD by IBM Corporation, trademarks thereof) is used to automate the deployment of software images in the cloud environment. As usual, each software image is created by preparing a reference virtual machine with the installation of the desired target operating system and application programs onto its mass memory. A snapshot of the mass memory of the reference virtual machine is then captured. This snapshot comprises all the files of the software programs (i.e., operating system and application programs) installed on the reference virtual machine. Particularly, the snapshot comprises configuration information of the software programs on the reference virtual machine (for example, stored in corresponding configuration files). Typical examples of such configuration information are network addresses and hostnames (such as of the reference virtual machine for the operating system and of listening ports for application programs implementing server-side services). The software image is then created by storing the snapshot into a single file in a pre-defined format for each virtualization layer wherein the software image is to be deployed (for example, conforming to the OVF specification, the VMDK specification by Vmware Inc., the VHD specification by Xen Inc., trademarks thereof); typically, the software image comprises one or more virtual disks (each one emulating a corresponding physical disk). In the solution according to an embodiment of the present disclosure, the deployment manager 305 injects an additional virtual disk into the software image, which virtual disk stores a configuration operating system, a scanner and a configurator (which are used to configure the software image, as described in detail in the following); particularly, the configuration operating system is a minimal operating system only offering basic functionalities (the same for all the software images, or at least for each category thereof, for example, having the same target operating system). The virtual disk of the configuration operating system is set as the primary bootable device of the software image (so as to cause its booting therefrom, as described in the following). All the software images available to be deployed in the cloud environment are stored into a (shared) software image repository 310 (action "A1.1.Create").

A cloud manager 315 (for example, the IBM Tivoli Service Automation Manager by IBM Corporation, trademarks thereof) is used to control the cloud environment. Particularly, the cloud manager 315 exposes an administration interface that is used by a system administrator to publish configuration information of the virtual machines to be provisioned from each software image into a (shared) configuration information repository 320; for example, the configuration information comprises a network address/hostname to the assigned to each virtual machine (such as obtained by incrementing a basic value), and a network address/hostname of other virtual machines already deployed in the cloud environment which it has to interact with (action "A2.Publish"). The cloud manager 315 also exposes a user interface that is used by every user of the cloud environment to request the provisioning of a (new) target virtual machine (with required characteristics) based on a selected software image; in response thereto, the cloud manager 315 submits a corresponding request to the deployment manager 305 (action "A3.Request").

For every target virtual machine to be provisioned, the deployment manager 305 retrieves the corresponding software image from the software image repository 310 and creates a copy thereof, denoted with the reference 325 (action "A4.Copy"). The deployment manager 305 then instantiates the target virtual machine, denoted with the reference 330, with the required characteristics (action "A5.Instantiate"). At this point, the deployment manager 305 turns on the target virtual machine 330. A boot loader stored in a firmware of the target virtual machine 330 that is executed at its turn-on (for example, the BIOS) identifies the virtual disk of the configuration operating system in the software image 325 as the primary bootable device, so that it boots from the configuration operating system, denoted with the reference 335 (action "A6.1.Boot"). The configuration operating system 335 mounts the software image 325 as a storage device (action "A7.1.Mount"). The configuration operating system 335 then launches the scanner, denoted with the reference 340, comprised in its virtual disk; the scanner 340 scans the software image 325 (for example, by leveraging corresponding APIs of the configuration operating system 335) so as to discover each software program (i.e., operating system and application program) comprised therein (action "A8.1.Scan"). At this point, the configuration operating system 335 launches the configurator, denoted with the reference 345, comprised in its virtual disk by passing an indication of the software programs discovered by the scanner 340. The configurator 345 downloads a configuration logic corresponding to each (discovered) software program (for example, provided by a corresponding vendor) from a (shared) configuration logic repository 350. The configuration logic comprises the instructions required to configure the software program; for example, the configuration logic is a configuration script that receives a list of configuration parameters with corresponding target values, and updates the configuration file of the software program accordingly by leveraging corresponding APIs of the configuration operating system 335 (action "A9.1.Download"). The configurator 345 also downloads any configuration information corresponding to the target virtual machine 330 from the configuration information repository 320 (action "A10.1.Download").

At this point, the configurator 345 applies each configuration logic against the software image 325 (based on the corresponding configuration information, if any), so as to configure the corresponding software program accordingly (for example, by launching the configuration script that writes the target values of the configuration parameters into the corresponding configuration file). Typically, the configuration logic configures the target operating system (for example, by writing the network address/hostname assigned to the target virtual machine 330). Moreover, the configuration logic may also configure one or more application programs (for example, by writing the network address/hostname of other virtual machines which they have to interact with). Preferably, the configuration operating system 335 is compatible with the target operating system of the software image 325; more specifically, this means that every application program that runs on the target operating system also runs on the configuration operating system 335 (for example, when the configuration operating system 335 is based on a kernel of the target operating system). In this case, the configuration logic may also run specific application programs; a typical example is the installation of new application programs onto the software image 325 (by running a corresponding installation program on the configuration operating system 335 that acts on the corresponding storage device). In any case, the configurations are applied without booting the target virtual machine 330 from the target operating system of the software image 325. As a result, it is possible to apply configurations that would be incompatible with operations that are executed automatically at the bootstrap of the target virtual machine 330. A typical example is the change of configuration parameters of the target operating system that are loaded at the beginning of its bootstrap; another example is the configuration of auto-start application programs, which are launched as high-priority services (so that a race condition may occur between their launching and configuration). After all the configuration logics have been applied, the configuration operating system 335 sets the virtual disk storing the target operating system of the software image 325 as the primary bootable device (action "A11.1.Configure").

At this point, the configuration operating system 335 re-starts (i.e., turns off and then turns on) the target virtual machine 330. The boot loader of the target virtual machine 330 that is executed at its turn-on now identifies the virtual disk of the target operating system as the primary bootable device, so that it boots from the target operating system, denoted with the reference 355. As a result, the target virtual machine 330 is brought into production in the cloud environment correctly configured as desired, with the virtual disk of the configuration operating system that is not used any longer (action "A12.1.Re-boot").

Figure 4:
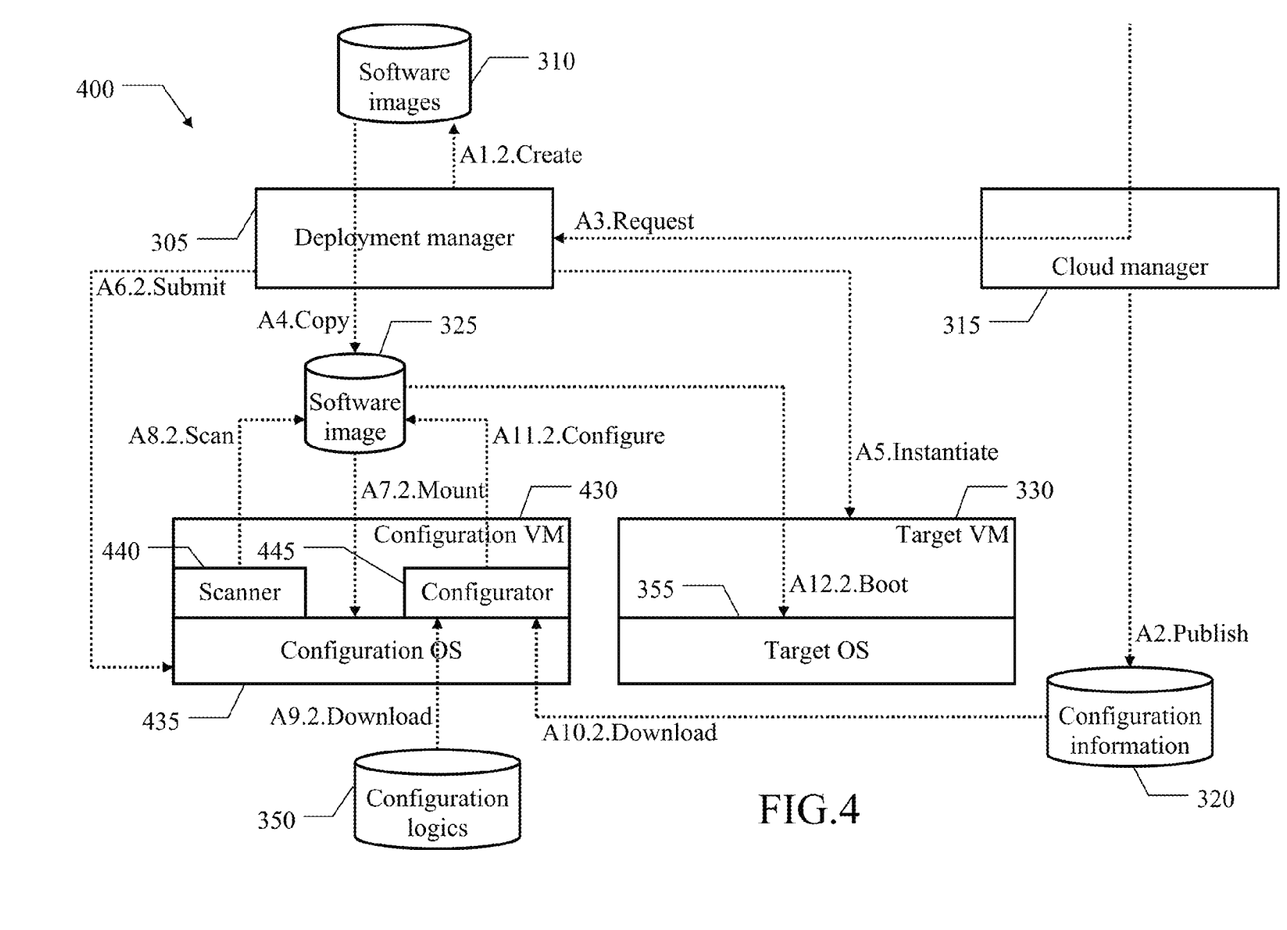
FIG. 4 shows a collaboration diagram representing the roles of the main software components that may be used to implement the solution according to another embodiment of the present disclosure.

With reference now to the FIG. 4, a collaboration diagram is shown representing the roles of the main software components that may be used to implement the solution according to another embodiment of the present disclosure.

All the software components (programs and data) are now denoted as a whole with the reference 400. In this case, the deployment manager 305 creates each software image (and stores it into the software image repository 310) without injecting any additional virtual disk for any configuration operating system, so that the virtual disk of the target operating system is normally set as the primary bootable device of the software image (action "A1.2.Create").

For every request of provisioning a (new) target virtual machine corresponding to a selected software image (same actions A2.Publish, A3.Request, A4.Copy and A5.Instantiate as above), the deployment manager 305 now submits a corresponding request to a configuration virtual machine 430 (always turned on). The configuration virtual machine 430 is dedicated to implement a configuration service in the cloud environment; for this purpose, the configuration virtual machine 430 comprises a similar configuration operating system 435, with a similar scanner 440 and a similar configurator 445 (action "A6.2.Submit").

In response thereto, as above the configuration operating system 435 mounts the software image 325 as a storage device (action "A7.2.Mount"). The configuration operating system 435 then launches the scanner 440 to discover each software program comprised in the software image 325 (action "A8.2.Scan"). At this point, the configuration operating system 435 launches the configurator 445 to download the configuration logic corresponding to each (discovered) software program from the configuration logic repository 350 (action "A9.2.Download"). The configurator 445 also downloads any configuration information corresponding to the target virtual machine 330 from the configuration information repository 320 (action "A10.2.Download"). The configurator 345 applies each configuration logic against the software image 325 (based on any corresponding configuration information), so as to configure the corresponding software program accordingly. After all the configuration logics have been applied, the configurator 445 dismounts the software image 325 (action "A11.2.Configure").

At this point, the deployment manager 305 turns on the target virtual machine 330. The boot loader of the target virtual machine 330 that is executed at its turn-on identifies the virtual disk of the target operating system 355 as the primary bootable device, so that it boots normally from it. As above, the target virtual machine 330 is then brought into production in the cloud environment correctly configured as desired (action "A12.2.Boot").

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, an embodiment provides a method for deploying a software image comprising a target operating system on a target computing machine. The method comprises the following steps. The software image is mounted as a storage device. Each software program comprised in the software image is identified. A configuration logic for configuring each software program is downloaded. Each configuration logic is applied against the software image. The target computing machine is booted from the target operating system.

However, the software image may be of any type (for example, formed by any number of files in any format), and it may be deployed onto any target computing machine (see below). The software image may be mounted as any storage device (for example, one or more local or remote virtual disks). The software programs comprised in the software image may be identified in any way (see below). The configuration logics may be downloaded in any way (for example, through a direct connection or a dedicated service) from any external repository (for example, a remote disk, web site, database, even distributed or mirrored on multiple nodes). Each configuration logic may be of any type (for example, one or more executable programs or simple lists of instructions). The configuration logics may be applied in any way (for example, by executing them directly, with an interpreter, with a Java virtual machine or under the control of a dedicated executor). The target computing machine may be booted from the target operating system in any way (for example, with an external command).

In an embodiment, the method further comprises booting the target computing machine from a configuration operating system; the deployment of the software image on the target computing machine is controlled by the target computing machine being booted from the configuration operating system.

However, the configuration operating system may be of any type (see below) and it may load any software program(s) dedicated to the configuration of the software image (down to none when all the corresponding operations are controlled by the configuration operating system directly); moreover, the configuration operating system may be provided in any way (for example, as a distinct bootstrap disk).

In an embodiment, the method further comprises receiving a request for configuring the target computing machine by a configuration computing machine running a configuration operating system implementing a configuration service; the deployment of the software image on the target computing machine is controlled by the configuration computing machine.

However, as above the configuration operating system may be of any type and it may load any software programs(s) dedicated to the configuration of the software image; moreover, the configuration computing machine may be of any type (for example, a dedicated physical machine), even not always running and activated upon request only.

In an embodiment, said identifying each software program comprised in the software image comprises scanning the software image.

However, the scan may be performed in any way (for example, directly by the configuration operating system); in any case, the software programs comprised in the software image may be identified in other ways (for example, by reading a descriptor associated with the software image, such as when conforming to the OVF specification).

In an embodiment, the method further comprises downloading configuration information for at least one configuration logic.

However, the configuration information may be downloaded in any way from any external repository (as above); moreover, the configuration information to be downloaded may be identified in any way (for example, in a configuration file that is attached to the software image before its deployment). In any case, the configuration information may be provided in other ways (for example, by storing it directly in this configuration file), or it may also be missing (for some or even all of the configuration logics).

In an embodiment, said applying each configuration logic against the software image comprises configuring the target operating system in the software image.

However, it is possible to apply any configuration to the target operating system (for example, by writing SSH public/private keys, enabling/disabling the DHCP).

In an embodiment, said applying each configuration logic against the software image comprises configuring at least one auto-start application program comprised in the software image.

However, it is possible to apply any configuration to any number of auto-start application programs (for example, enabling/disabling selected features of an anti-virus).

In an embodiment, the configuration operating system is compatible with the target operating system; said applying each configuration logic against the software image comprises installing at least one further application program onto the software image.

However, the configuration operating system and the target operating system may be of any type (even exactly the same); moreover, any type and number of further application programs may be installed onto the software image.

More generally, the configuration logics may configure any feature of the software image (for example, only relating to the target operating system, to one or more application programs, tools, widgets, or any combination thereof); moreover, the configuration logics may act on the corresponding software program in any way (for example, by directly updating its code).

In an embodiment, the target computing machine is a target virtual machine; the method further comprises instantiating the target virtual machine.

However, the application of the above-described solution to any other target computing machine (even of the physical type) is not excluded.

In an embodiment, said instantiating the target virtual machine comprises instantiating the target virtual machine in a cloud environment.

However, the same solution may also be applied in any other computing environment (for example, for disaster recovery applications).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program for causing a computing system to perform the steps of the above-mentioned method when the computer program is executed on the computing system.

A further embodiment provides a computer program product comprising a non-transitory computer readable medium embodying a computer program, the computer program comprising code directly loadable into a working memory of a computing system thereby configuring the computing system to perform the same method.

However, the above-described solution may be implemented as a stand-alone software program, as a plug-in for a deployment manager or even directly in the deployment manager itself. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the above-described method.

However, this method may also be carried out on a system based on a different architecture (for example, a local, wide area, global, cellular or satellite network), and exploiting any type of (wired and/or wireless) connections. Moreover, the system may comprise any number of computing machines (down to a single main-frame). Each computing machine may have another structure or may comprise similar elements; moreover, it is possible to replace the computing machine with any code execution entity, either based on a physical machine or a virtual machine (such as a PDA, a mobile phone, and the like), or with a combination of multiple entities (such as a multi-tier architecture, a grid computing infrastructure, and the like).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method for deploying a software image on a target computing machine, the software image comprising a target operating system and one or more software programs, the method comprising:
    injecting a virtual disk into the software image, the virtual disk being set as a primary bootable device of the software image and storing a configuration operating system, a scanner, and a configurator; and
    in response to receiving a request to provision the target computing machine with the software image, instantiating the target computing machine, the target computing machine:
        identifying the virtual disk in the software image,
        booting the configuration operating system stored in the virtual disk, the configuration operating system mounting the software image as a storage device, launching the scanner stored in the software image, and launching the configurator stored in the software image, the scanner identifying each software program comprised in the software image, and the configurator downloading, from a repository external to the software image and for each software program identified by the scanner, a configuration logic for configuring the corresponding software program,
        applying each configuration logic against the software image to configure each software program identified, and
        booting from the target operating system.

2. The method of claim 1 further comprising:
    receiving a request for configuring the target computing machine by a configuration computing machine running the configuration operating system and implementing a configuration service, a deployment of the software image on the target computing machine being controlled by the configuration computing machine.

3. The method of claim 1 wherein identifying each software program comprised in the software image comprises:
scanning the software image.

4. The method of claim 1 wherein applying each configuration logic against the software image to configure each software program identified comprises:
configuring the target operating system in the software image.

5. The method of claim 1 wherein applying each configuration logic against the software image to configure each software program identified comprises:
configuring at least one auto-start application program comprised in the software image.

6. The method of claim 1 wherein the configuration operating system is compatible with the target operating system, and applying each configuration logic against the software image to configure each software program identified comprises:
installing at least one further application program onto the software image.

7. The method of claim 1 wherein the target computing machine is a target virtual machine.

8. The method of claim 7 wherein instantiating the target computing machine comprises:
instantiating the target virtual machine in a cloud environment.

9. A computer program product for for deploying a software image on a target computing machine, the software image comprising a target operating system and one or more software programs, the computer program product comprising:
a non-transitory computer readable medium storing program code that, when executed by a computing system, causes the computing system to:
inject a virtual disk into the software image, the virtual disk being set as a primary bootable device of the software image and storing a configuration operating system, a scanner, and a configurator; and
in response to receiving a request to provision the target computing machine with the software image, instantiate the target computing machine, the target computing machine:
identifying the virtual disk in the software image,
booting the configuration operating system stored in the virtual disk, the configuration operating system mounting the software image as a storage device, launching the scanner stored in the software image, and launching the configurator stored in the software image, the scanner identifying each software program comprised in the software image, and the configurator downloading, from a repository external to the software image and for each software program identified by the scanner, a configuration logic for configuring the corresponding software program,
applying each configuration logic against the software image to configure each software program identified, and
booting from the target operating system.

10. A system for deploying a software image on a target computing machine, the software image comprising a target operating system and one or more software programs, the system comprising:
one or more processors; and
a memory coupled to the one or more processors, the memory storing program code that, when executed by at least one of the one or more the processors, causes the system to:
inject a virtual disk into the software image, the virtual disk being set as a primary bootable device of the software image and storing a configuration operating system, a scanner, and a configurator; and
in response to receiving a request to provision the target computing machine with the software image, instantiate the target computing machine, the target computing machine:
identifying the virtual disk in the software image,
booting the configuration operating system stored in the virtual disk, the configuration operating system mounting the software image as a storage device, launching the scanner stored in the software image, and launching the configurator stored in the software image, the scanner identifying each software program comprised in the software image, and the configurator downloading, from a repository external to the software image and for each software program identified by the scanner, a configuration logic for configuring the corresponding software program,
applying each configuration logic against the software image to configure each software program identified, and
booting from the target operating system.

11. The system of claim 10 wherein the program code further causes the system to:
receive a request for configuring the target computing machine by a configuration computing machine running the configuration operating system and implementing a configuration service, a deployment of the software image on the target computing machine being controlled by the configuration computing machine.

12. The system of claim 10 wherein identifying each software program comprised in the software image comprises scanning the software image.

13. The system of claim 10 wherein applying each configuration logic against the software image to configure each software program identified comprises:
configuring the target operating system in the software image.

14. The system of claim 10 wherein applying each configuration logic against the software image to configure each software program identified comprises:
configuring at least one auto-start application program comprised in the software image.

15. The system of claim 10 wherein the configuration operating system is compatible with the target operating system, and applying each configuration logic against the software image to configure each software program identified comprises:
installing at least one further application program onto the software image.

16. The system of claim 10 wherein the target computing machine is a target virtual machine.

17. The system of claim 16 wherein instantiating the target computing machine comprises:
instantiating the target virtual machine in a cloud environment.

* * * * *

UNITED STATES PATENT AND TRADEMARK OFFICE
CERTIFICATE OF CORRECTION

PATENT NO. : 9,542,174 B2
APPLICATION NO. : 14/303217
DATED : January 10, 2017
INVENTOR(S) : Antonio Di Cocco et al.

Page 1 of 1

It is certified that error appears in the above-identified patent and that said Letters Patent is hereby corrected as shown below:

In the Claims

At Column 13, Claim number 9, Line number 31, after "for" delete "for"

At Column 14, Claim number 10, Line number 4, after "more" delete "the"

Signed and Sealed this
Sixth Day of June, 2017

Michelle K. Lee
*Director of the United States Patent and Trademark Office*